[11] 3,610,972

| [72] | Inventor | Yves J. Pelenc |
|---|---|---|
|  |  | La Tronche, France |
| [21] | Appl. No. | 753,237 |
| [22] | Filed | Aug. 16, 1968 |
| [45] | Patented | Oct. 5, 1971 |
| [73] | Assignee | Merlin Gerin, Societe Anonyme |
|  |  | Grenoble, France |
| [32] | Priority | Sept. 1, 1967, Sept. 8, 1967 |
| [33] |  | France |
| [31] |  | 119804 and 120528 |

[54] LINEAR INDUCTION MOTOR
7 Claims, 18 Drawing Figs.

[52] U.S. Cl. .................................................. 310/13,
104/148 LM
[51] Int. Cl. ........................................................ H02k 41/02
[50] Field of Search............................................ 310/12–15,
172

[56] References Cited
UNITED STATES PATENTS

| 3,513,338 | 5/1970 | Poloujadoff ................. | 310/13 |
| 448,598 | 3/1891 | Wheeler et al ............... | 310/13 |
| 3,196,303 | 7/1965 | Rowland et al. ............... | 310/172 |
| 3,194,032 | 7/1965 | Von Brimer.................. | 310/13 X |
| 1,910,639 | 5/1933 | Rose............................ | 310/13 |
| 2,337,430 | 12/1943 | Trombetta.................... | 310/13 |
| 1,985,254 | 12/1934 | Huse ............................ | 310/13 |
| 3,356,041 | 12/1967 | Bliss ............................ | 310/12 X |
| 3,158,765 | 11/1964 | Polgreen ..................... | 310/12 |

FOREIGN PATENTS

| 181,014 | 12/1906 | Germany..................... | 310/12 |
| 31,694 | 7/1967 | Great Britain................ | 310/12 |
| 414,471 | 1946 | Italy ............................ | 310/12 |
| 361,098 | 12/1905 | France ......................... | 310/12 |

*Primary Examiner*—D. X. Sliney
*Assistant Examiner*—B. A. Reynolds
*Attorney*—Stevens, Davis, Miller & Mosher ABSTRACT: Linear induction motor having a fixed elongated armature disposed along a linear path and cooperating with a movable magnetic core member. An electrical conductor disposed along said path energizes said core member by way of magnetic induction in order to produce a traveling magnetic field driving said core member.

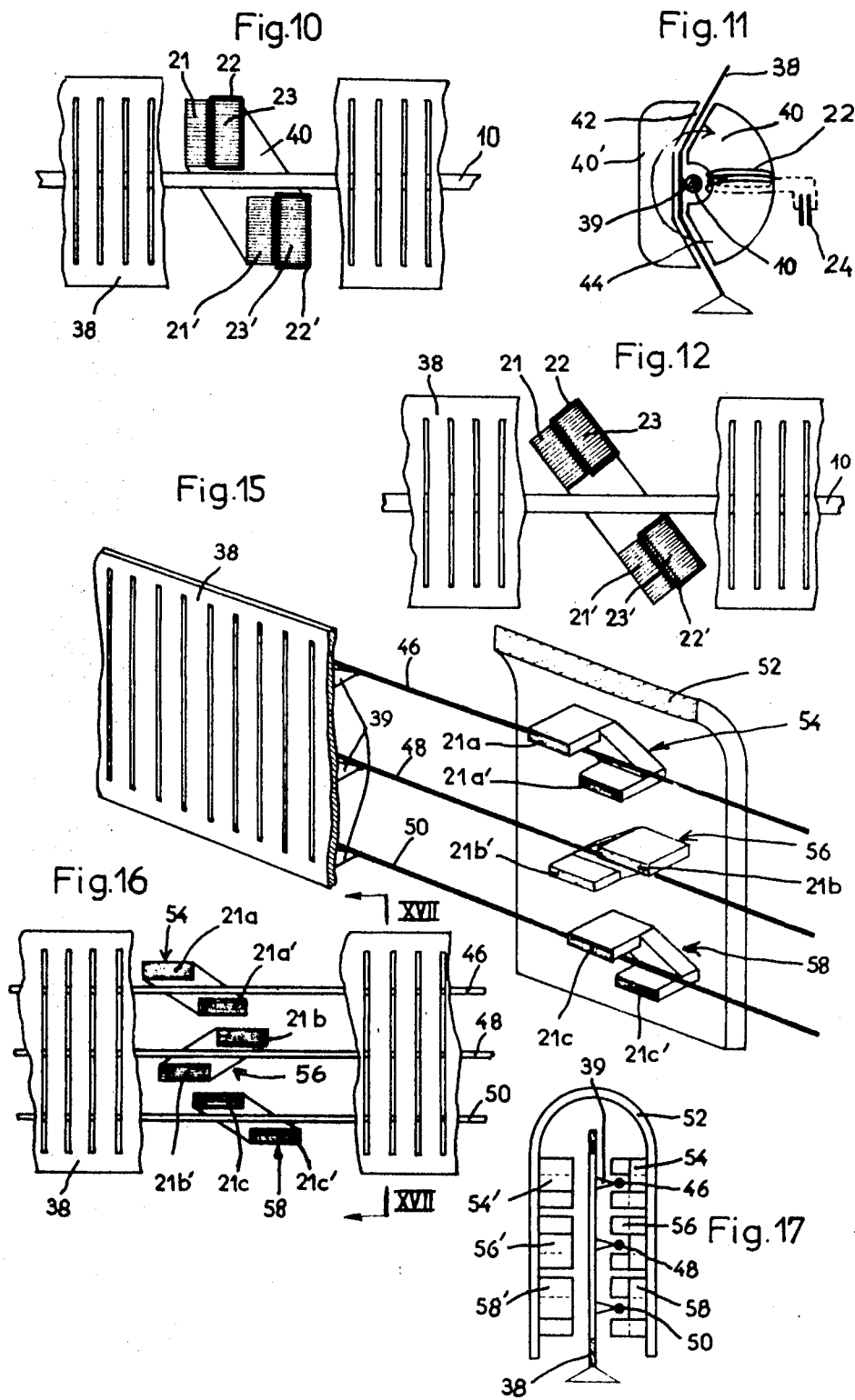

LINEAR INDUCTION MOTOR

The present invention relates to a linear induction motor comprising an elongated stationary armature which is arranged along a given linear path and cooperates with a traveling magnetic field produced in at least one gap of at least one moving magnetic circuit which is capable of following said path, the magnetic flux produced in the said magnetic circuit passing substantially through said gap and said armature.

It is already known to produce a sliding magnetic field on a moving part of the motor, said field cooperating with a stationary armature, generally of rail shape, which is sometimes improperly referred to as a "rotor" and which may be extended indefinitely in space. For this purpose, inductor windings are provided on the moving part which is at times improperly referred to as the "stator".

The advantages of such motors are well known, particularly their low consumption of electric power, as a traveling field is produced only on an active portion of small length. Up to now, the known motors have been provided with a source of current which is connected to the moving part, or with wiping brushes or contacts for the feeding of the inductor windings.

An object of the present invention is to overcome this drawback and to make it possible to produce said traveling magnetic field from stationary elements extending along the path of the moving part without there being any electrical or mechanical contact between the stationary parts and said moving part.

The linear induction motor of the present invention comprises a stationary electric conductor which extends along said path and is fed by a source of alternating current and is inductively coupled with said magnetic circuit in order to create a magnetic flux therein, said magnetic circuit being arranged to produce said traveling magnetic field in said gap under the action of the current flowing in said conductor.

There has already been proposed a sort of sliding or traveling transformer which makes it possible to feed the electric motors for the driving of a vehicle by inductive coupling of a coil rigidly fastened to the vehicle with a stationary electric line extending along the path of the vehicle. This idea has never been reduced to practice, since it was not known how said inductively collected energy could be efficiently utilized.

The inventive magnetic collection arrangement can be utilized in linear motors of very different construction and a few preferred embodiments of such motors will be described now, while it will be obvious to those skilled in the art that various changes and modifications may be made without departing from the spirit and scope of the invention as defined by the appended claims.

In the accompanying drawings:

FIG. 10 is an elevation of another embodiment of a single-phase motor according to the invention, a part of the armature being broken away to show a part of the magnetic circuit;

FIG. 11 is a side view of the motor of FIG. 10, with a herringbone or dihedral armature;

FIGS. 12, 13 and 14 illustrate different other embodiments of the motor of FIG. 10;

FIG. 15 is a perspective view of a three-phase motor comprising elements of the type shown in FIG. 10;

FIG. 16 is an elevation of the device of FIG. 15, a part of the secondary or armature being broken away to show the magnetic circuits;

FIG. 17 is a cross section along the line XVII—XVII of FIG. 16;

Figure 1:
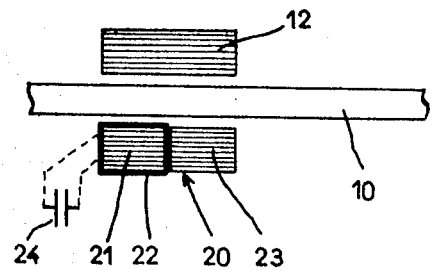
FIG. 1 is a schematic elevation in axial cross section of a single-phase motor according to the invention in which the armature has not been shown.
Figure 2:
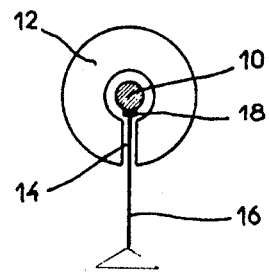
FIG. 2 is a left-hand view of the device of FIG. 1, showing the armature also.

In the various figures, the same reference numbers designate identical or similar parts. Referring to FIGS. 1 and 2, there can be noted a fixed wire conductor or line 10, only a section of which has been shown and which extends along the path of a linear motor and is connected to a feeding source (not shown) of a single-phase alternating current. The conductor 10 may be of any cross section, round (see FIG. 2), square (see FIG. 4), etc. and may comprise several wires (see FIG. 6), possibly insulated from each other. A magnetic circuit 12 of split-ring or horseshoe shape surrounds the conductor 10 and is guided by any desired means (not shown) so as to be capable of moving along a path parallel to the stationary wire conductor 10. It is easy to see that an alternating electric current passing through the conductor 10 will induce a magnetic field with circular lines of force in the magnetic circuit having a ring 12 which is, of course, of a suitable ferromagnetic material, such as high permeability laminations, and in particular in the airgap 14 defined by the slit of the ring 12. The conductor 10 is supported by a plate or blade 16 of an electrically conductive material of rail shape extending over the entire length of the conductor 10 and of suitable cross-sectional shape. The plate 16 may or may not be insulated electrically from the conductor 10 (for instance, by an interposed layer 18 of insulating material) and extends through a gap 14 which is of sufficient width to permit displacement of the magnetic circuit 12 without the latter contacting plate 16. The plate 16 may be flat or skew, for instance having the profile of a circular arc or of herringbone or dihedral shape (see FIG. 11). The split, ring or torus 12 has a cylindrical elongated shape so as to present a rectangular gap pole surface 20, the length of which extends over a certain distance from the conductive plate 16. The gap surface 20 is subdivided into two equal sections 21, 23, one of which, 21, is surrounded by a short circuit coil or Frager turn (phase-shift ring) 22, housed in a groove (not shown) substantially in an axial plane of the conductor 10. A capacitor 24 (represented in dotted line in FIG. 1) can possibly be interposed in the circuit of the winding 22 in order to increase the effectiveness thereof in a manner which is well known per se.

The motor of FIGS. 1 and 2 operates in the following manner:

When a single-phase electric current passes through the conductor 10, an alternating magnetic field is produced in the magnetic circuit 12, the short-circuited turn or Frager turn 22 shifting the field in the well-known manner in section 21 with respect to the field of section moving of the gap 20. These sections 21, 23 constitute two poles which in conventional manner produce a moving magnetic field. The plate 16 which is subjected to the action of this traveling field is the point or origin of eddy currents and there results therefrom a force and consequent relative displacement between the ring 12 and the plate 16, as well known to those skilled in the art. The assembly constitutes a true linear motor with a stationary armature of rail shape 16 along which the moving part 12 is propelled.

It is easy to see that the motor which forms the object of the invention does not have any feed by brushes or wiper contacts. These advantages result from the fact that the traveling field is not produced by windings which are integral with the moving part and fed from the outside, but from a stationary conductor.

Figure 3:
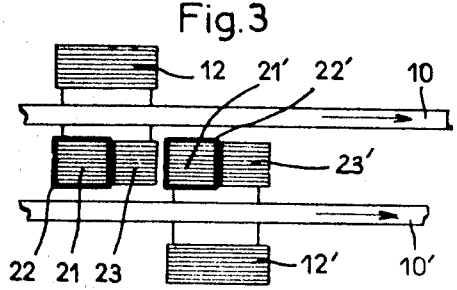
FIG. 3 is a view similar to FIG. 1 of a motor according to another embodiment of the invention, the armature not being shown.
Figure 4:
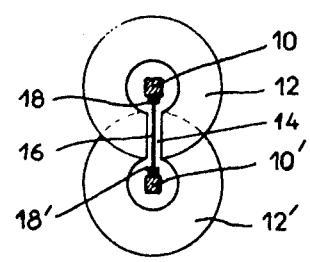
FIG. 4 is a left-hand view of the arrangement of FIG. 3, showing also the armature.
Figure 5:
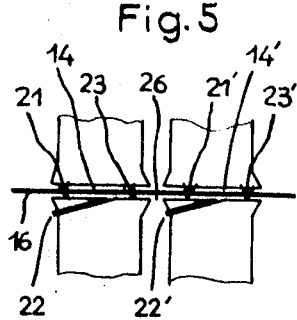
FIG. 5 shows a detail of the magnetic circuit of FIG. 3.

Referring now to FIGS. 3 to 5 which relate to a single-phase linear motor which operates in accordance with the same general principle as the motor described above but with a higher efficiency, there can be noted two wire conductors 10, 10' which are parallel to and spaced from each other and, as previously described, are traversed by single-phase electric currents oriented in the same direction as indicated for a given moment by arrows in FIG. 3. Around each of the conductors 10, 10', there are arranged alongside of each other slit rings 12, 12' of a construction identical to the magnetic circuit 10 of the motor of FIG. 1, in such a manner that the respective gaps 14, 14' are coplanar to the plane defined by the conductors 10, 10' and are aligned. The plate 16 or armature of the motor is arranged between the conductors 10, 10' and fastened to them possibly by an insulator 18, 18'. A Frager turn of phase-shift ring 22, 22' surrounds each of the half sections 21, 21' as previously described, and a slight space 26 is provided between the adjacent sections of the gap sections 23, 21' (see FIG. 5).

It will be understood that if the current which flows in the conductor 10 at a given moment produces, for instance, a north pole in the section 23, the current in phase in the conductor 10' will then produce a south pole in the section 23'.

The Frager turns 22, 22' produce a phase shift, then causing an "east" pole to appear due to a flow shifted by 90° in the section 21 and a "west" pole to appear in the section 21', creating a true traveling field which cooperates with the armature 16. This improved motor has the same advantages as the motor of FIG. 1 and creates a true two-phase traveling field.

The conductors 10, 10' of the linear motors shown in FIG. 3 can be supported only at their ends, since any intermediate support would interfere with the displacement of the moving part. In certain applications specific to conductors of long length such supports may however be indispensable.

In accordance with a first development of the invention, the conductors 10, 10' are supported by retractable supports (not shown) which retract upon the passage of the moving unit, for instance under the action of a guide rigidly connected with the moving unit which moves them apart in opposition to a spring system upon the passage of the moving unit.

Figure 6:
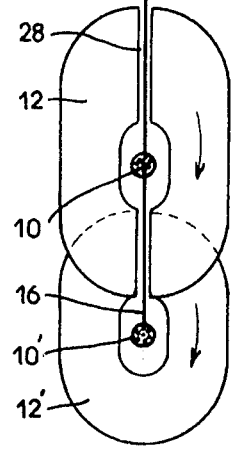
FIG. 6 is a view similar to FIG. 4 of a third type of motor comprising an armature and suspended wire conductors.

In accordance with a second development of the invention, as shown in FIG. 6, one of the magnetic circuits 12 is provided with a second slit or gap 28 through which a support plate member 30 of insulating material extends and is fastened to the conductor 10. This plate 30 does not participate in the operation of the motor and it has the drawback of introducing an additional gap 28 and thus asymmetry of the gaps.

Figure 7:
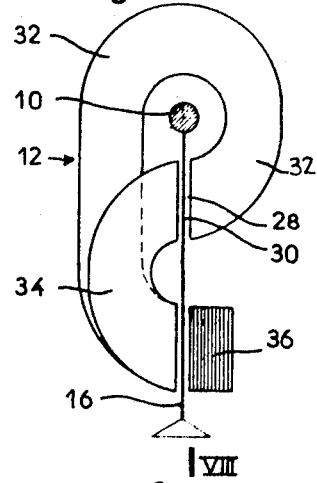
FIG. 7 is a side view of a fourth type of motor in accordance with the invention with supported fixed armature and conductor.
Figure 8:
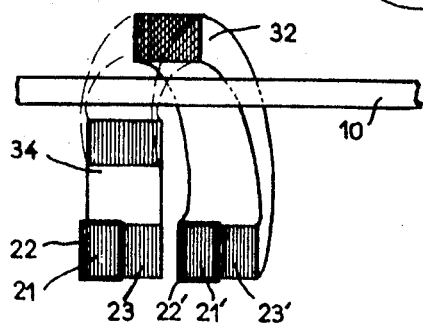
FIG. 8 is a cross section along the line VIII—VIII of FIG. 7 showing the arrangement of the various poles, the armature not being shown.
Figure 9:
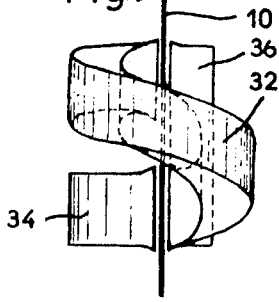
FIG. 9 is a plan view of the arrangement of FIG. 7.

In accordance with another development of the invention shown in FIGS. 7 to 9, the two-phase traveling field is produced by a single conductor 10 traversed by a single-phase current and supported by an insulating plate 30 which is extended by a plate 16 which may or may not be coplanar with the former and is made of conductive material and constitutes the armature of the motor. A magnetic circuit 12 having the form of a skew ring comprises an upper loop 32 which surrounds the conductor 10 and is extended by a semicircular branch 34 on the one hand and by a yoke 36 which connects with the lower end of the branch 34, the lower ends of the two branches 34, 32 being spaced longitudinally in the direction of the conductor 10. The yoke 36 defines with its ends and with the lower ends of the branches 34 and 32 two gaps which intersect the plane of the plate 16. Referring more particularly to FIG. 8, it is seen that the poles constituted by each of said branches 32 and 34 are subdivided into equal sections 21, 23 and 21', 23' respectively, two of which as previously described, are surrounded by a Frager turn 22, 22'. These poles opposite the armature 16 produce the displacement of the moving part of the motor in the manner described above. A third gap 28 formed between the upper ends of the branches 32 and 34 permits the passage of the support 30, but, as in the embodiment of FIG. 6, does not intervene directly in the operation of the motor. It is furthermore superfluous if the conductor 10 can be supported otherwise than by a plate 30.

FIGS. 10 and 11 show a single-phase motor not having the drawback of inactive gaps while creating a true double-phase traveling field produced by a single conductor supported along the entire path. The conductor 10 is supported via insulators 39 by an armature 38, known per se, of ladder shape made of conductive material with bars perpendicular or oblique with respect to the conductor 10. In the embodiment in FIG. 11 a profile of the armature 38 is a herringbone profile but it could obviously be flat or some other cross-sectional shape. A magnetic circuit in the shape of a ring having two parts 40, 40' (the part 40' having been eliminated in FIG. 10) surrounds the conductor 10 and defines two gaps 42, 44 permitting the passage of the armature 38. The ring 40 is slightly twisted so as to stagger the front surfaces of the two slits or slots 42, 44 longitudinally with respect to each other in the direction of the conductor 10 by an amount at least equal to their width. The pole sections 21, 23 and 21', 23', of which 23 and 23' are provided with Frager turns 22, 22' have a succession of poles creating a traveling field, as in the examples described above. It should be noted that due to the presence of the conductive bars of the ladder 38 which extend over a height at least equal to the transverse distance between the two poles 21, 23 and 21', 23', the current lines induced in the ladder 38 are fully determined and the shift of the poles in the direction of the bars does not have a harmful influence on the operation of the motor. The operation is obvious on basis of the explanations given above. If the current which flows in the conductor 10 produces a "north pole" in the pole section 21, the section 21' will be a south pole and the presence of the Frager currents will create east and west poles in the sections 23 and 23' respectively. The north, east, south and west poles will therefore follow one behind the other in the direction of the conductor 10 which is the direction of the advance of the moving part, which arrangement is in accord with the general principle of traveling field motors explained above.

The longitudinal shifting of the poles which, in the example shown in FIG. 10, is effected by the special shape of the magnetic ring 40, can be obtained by the simple inclination in the direction of the conductor 10 of a flat ring of revolution 42 in the manner illustrated in FIG. 12. The result and the operation are of course the same as those in the motor of FIG. 11.

Figure 13:
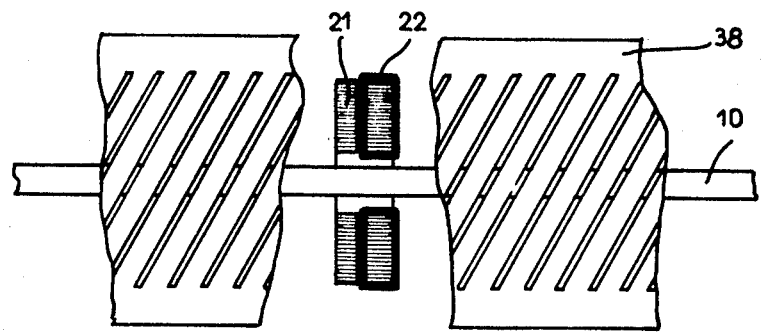
Figure 14:
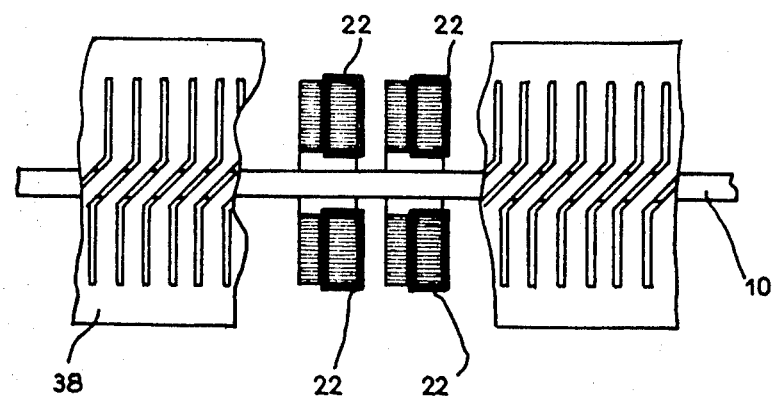

FIGS. 13 and 14 illustrate two variant embodiments of the motor according to FIG. 10 with poles not shifted longitudinally but with bars of the armature 38 inclined or oblique (FIG. 13) or with ladder bars (FIG. 14). The relative inductor/armature position not being modified, the operation if of course the same. The bars need not necessarily be linear but for instance may be in the form of a broken line. Several assemblies of poles could be associated and juxtaposed (see FIG. 14).

The invention is of course by no means limited to a single-phase motor and FIGS. 15, 16 and 17 show by way of example a three-phase motor based on the principle of operation of the single-phase motor of FIGS. 10 and 11, which may be extended to any polyphase motor.

Three conductors 46, 48 and 50 of a three-phase line extend parallely in the same plane or not along the path of the moving part 52, for instance of horseshoe shape. The conductors 46, 48, 50 are borne via insulators 39 by the armature 38 having the same ladder configuration as that of the motor of FIG. 10. The moving unit 52 straddles the armature 38 and the associated conductors 46, 48, 60 and is guided by any means (not shown) permitting its displacement over the path defined by the armature 38. Three magnetic circuits 54, 56, 58 each surrounding one phase conductor 46, 48, 50 are borne by the moving unit 52. These circuits are either as shown in the drawings in the form of steps similar to the magnetic circuits shown in FIG. 10 or arranged obliquely similar to the circuits of FIG. 12 so as to provide a longitudinal shift of the pairs of gaps 21a, 21a'; 21b, 21b'; 21c, 21c' with respect to each other, for instance by one-third of the pole pitch. An arrangement similar to that of FIGS. 13 and 14 is of course also possible.

The circuits 54, 56, 58 are overlapped so as to produce in the longitudinal direction a succession of poles 21a, 21b', 21c;

21a', 21b, 21c', under the effect of the magnetic fluxes produced by the currents flowing in the conductors 46, 48, 50.

The magnetic circuits 54, 56, 58 are preferably closed by magnetic yokes 54', 56', 58' arranged symmetrically with respect to the armature 38 and borne by the moving unit 52. These yokes could serve as magnetic circuits of a symmetrical motor with second three-phase line and associated magnetic circuits arranged on the opposite face of the armature 38. It should be noted that the pole pitch of such a motor is defined by the distance between the two poles 21a, 21a' of one and the same pair, said pole pitch being for instance capable of variation by simple inclinations of the circuits 54, 56, 58.

The magnetic circuit 56 is, in the manner shown in FIG. 15 and 16, reversed to compensate for the discontinuity of the poles, due to an open inductor. This motor operates in the same manner as those of FIGS. 10 and 12.

Figure 18:
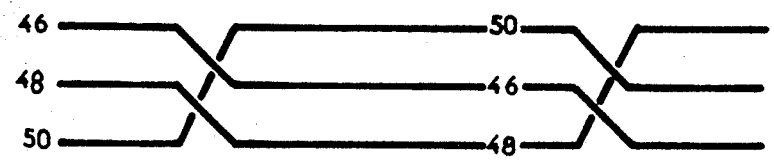
FIG. 18 is a connecting diagram of the lines of a motor according to FIG. 15 to effect electrical balancing.

In order to avoid an imbalance between the phases, it is desirable to exchange at regular intervals the conductors 46, 48, 50 along the path of the motor (see FIG. 18) being careful to retain the suitable succession of the phases so as to preserve the direction of advance.

Although the different types of motor have been more particularly described as single-phase or three-phase motor it is to be understood that there construction and operation can easily be adapted to any polyphase currents. All have the advantage of the absence of rubbing feed contacts which confers upon them remarkable strength and reliability in operation.

What is claimed is:

1. A single-phase linear induction motor having a body movable along a predetermined linear path and comprising: a pair of spaced-apart, stationary, longitudinal, alternating current energizable conductors extending parallelly along said path; said body comprising a pair of core members, one for each conductor and embracing the corresponding one of said conductors; said core members having each a pair of confronting pole faces defining an airgap; the airgaps of said core members being aligned in the longitudinal direction of said path; a flat stationary armature of conductive material extending along said path; said airgaps being traversed by said armature; and magnetic field phase shift means on each of said core members; said airgaps being spaced apart a distance so that corresponding portions of said pole faces of said core members are respectively of opposite magnetic polarity to produce a moving magnetic field in said airgaps causing said body to move along said path when said conductors are energized by in-phase alternating currents.

2. A single-phase linear induction motor having a body movable along a predetermined linear path comprising: a stationary, longitudinal, alternating current energizable conductor extending parallelly along said path; said body comprising a magnetic core member embracing said conductor and defining a pair of airgaps so that said conductor, when alternating current energized, generates a magnetic field in said airgaps; a flat stationary armature of conductive material extending along said path; said airgaps being traversed by said armature; said armature including a plurality of parallel current paths extending at an angle with respect to said conductor; said airgaps being staggered one relative to the other transversely of said conductor and transversely of the general longitudinal direction of said parallel current paths; and a magnetic field phase shift means on said core members to produce a moving magnetic field in said airgaps causing said body to move along said energized conductor.

3. A polyphase linear induction motor having a body moving along a predetermined linear path and comprising: at least three spaced-apart, longitudinal, stationary, polyphase energizable conductors extending parallelly along said path; said body comprising a plurality of magnetic core members, one for each said conductor; a stationary flat armature of conductive material extending along said path; said armature including a plurality of closely spaced parallel current paths extending in a direction transverse of the longitudinal direction of said conductors; said core members embracing respective conductors and each defining a pair of airgaps staggered in said longitudinal direction; said armature traveling the airgaps of all core members; and said core members being staggered in said longitudinal direction of said conductors so as to cause said body to move along said polyphased energized conductors.

4. A linear induction motor comprising: a stationary alternating current energizable linear conductor: a magnetic field member disposed in magnetic induction coupled relation with said conductor so that said conductor, when energized, generates a flux of magnetic induction in said member; said member having at least a pair of associated magnetic pole faces of opposite polarity on opposed sides of said conductor; an elongated armature extending parallel to said conductor and having a plurality of distinct closely spaced, closed current paths; portions of said armature being disposed in confronting relation with said pole faces; and means for producing a varying flux distribution in said portions of said armature, longitudinally of said armature, said magnetic field member and said armature being relatively movable, with respect to one another, parallelly to the longitudinal direction of said conductor whereby said current paths extend in a direction causing each path to be linked, during said relative movement, successively with fluxes traversing said pole faces, so that the alternating current energizing of said conductor causes said relative movement by induction in said current paths of currents cooperating with the magnetic field issuing from said pole faces.

5. A polyphase induction motor comprising: a plurality of stationary, polyphase energizable, linear, spaced-apart conductors extending longitudinally along a predetermined path; a magnetic field structure and an armature structure, one of said structures being adapted for relative movement with respect to the other structure along said conductors, said magnetic field structure comprising a plurality of members of magnetic material, one for each conductor and embracing respective conductors in magnetic induction coupled relation therewith, each of said members of magnetic material being shaped to define at least a pair of associated magnetic pole faces of opposite polarity on opposed sides of the corresponding conductor when said conductor is energized; said armature structure extending parallel to said conductors and having a plurality of closely spaced, parallel, closed current paths; portions of said armature structure being disposed in confronting relation with said pole faces of all of said members; said associated pole faces of each member and the pole faces of all of said members being staggered with respect to said current paths in the longitudinal direction of said conductors in a manner causing each current path to enter in flux-linking relation successively with all of said pole faces during said relative movement thus inducing current in said current paths causing said relative movement when said conductors of polyphase energized.

6. An electric drive arrangement comprising an elongated electrically conductive rail; carriage means of magnetic material comprising a pair of core members, each of said core members being shaped to define a gap and shaped and positioned as to partially embrace said rail with a portion of said rail being within said gap, a magnetic flux path being defined by each core member, said gap thereof and the width of said portion of said rail within said gap, said gaps of said core members being aligned in the longitudinal direction of said rail so as to partially embrace portions of said rail longitudinally spaced apart a distance substantially equal to the distance between two successive poles of opposite polarity; a pair of spaced apart electrical current-carrying conductors extending parallel to said rail and embraced within said core members respectively, said conductors being positioned within said carriage means such that in-phase alternating currents passing respectively through said conductors will generate a magnetic flux along each said magnetic flux path; and means for producing a varying flux distribution in said portions of said rail, longitudinally of said rail, thereby producing a propelling reaction force in said carriage means parallel to said rail.

7. An electric drive arrangement comprising an elongated flat electrically conductive rail; electrical current-carrying conductor means extending parallel to said rail; carriage means of magnetic material shaped to define a closed magnetic flux having a loop portion and at least a pair of airgaps, said loop portion and said airgaps being magnetically series connected and shaped and positioned so that said loop portion embraces said conductor means and said airgaps are spaced apart in the longitudinal direction of said conducting means with longitudinally spaced-apart portions of said rail within said airgaps respectively; and means for producing a varying flux distribution in said portions of said rail, longitudinally of said rail, such that alternating current passing through said conductor means will generate a magnetic flux passing through said magnetic flux path thereby producing a propelling reaction force in said carriage means parallel to said rail.